SEARCH ROOM

Jan. 27, 1970 A. M. REITER ET AL 3,492,577

AUDIENCE RATING SYSTEM

Filed Oct. 7, 1966 4 Sheets-Sheet 1

INVENTORS
ABRAHAM M. REITER
PATRICK R. J. COURT
WILLIAM C. RUBINSTEIN
PATRICK A. C. SEGRAVE

BY Samuel Lindenberg
Arthur Frelich

ATTORNEYS

INVENTORS: ABRAHAM M. REITER
PATRICK R. J. COURT
WILLIAM C. RUBINSTEIN
PATRICK A. C. SEGRAVE
BY Samuel Lindenberg
Arthur Freilich
ATTORNEYS INVENTORS: ABRAHAM M. REITER
PATRICK R. J. COURT
WILLIAM C. RUBINSTEIN
PATRICK A. C. SEGRAVE
BY Samuel Lindenberg
Arthur Freilich
ATTORNEYS INVENTORS: ABRAHAM M. REITER
PATRICK R. J. COURT
WILLIAM C. RUBINSTEIN
PATRICK A. C. SEGRAVE BY Samuel Lindenberg
Arthur Freilich
ATTORNEYS United States Patent Office 3,492,577
Patented Jan. 27, 1970

3,492,577

AUDIENCE RATING SYSTEM

Abraham M. Reiter, Reseda, Patrick R. J. Court, Los Angeles, Patrick A. C. Segrave, Santa Monica, and William C. Rubinstein, Van Nuys, Calif., assignors to International Telemeter Corporation, Los Angeles, Calif., a corporation of New York Filed Oct. 7, 1966, Ser. No. 585,136
Int. Cl. H04b *1/00*
U.S. Cl. 325—31 4 Claims

ABSTRACT OF THE DISCLOSURE

An audience rating system is provided wherein a transmitter generates starting signals as well as other identification signals for the program to be rated. These signals are frequency modulated with a high audio frequency carrier and then multiplexed with the audio portion of the program. This is transmitted to a receiver which after demodulating the signals, enables a recorder to commence recording the rating identifying signals if a particular starting code is included in the received signals and further, if the audio level of the sound being produced by the receiver is above a predetermined threshold.

This invention relates to systems for determining the size of an audience listening to a radio or television broadcast, and more particularly to improvements therein.

The size of the audience listening to radio and television broadcasts can be determined in several ways, besides the basic technique of making telephone surveys or door-to-door surveys. For example, apparatus may be attached to a home receiver for making a recording of a station which is tuned in when the receiver is operated, as well as of the time and date. Another system makes a recording of the audio signal being reproduced. These audio signal recordings are collected and compared with audio recordings of programs for identification and counting.

Because of the large number of receivers involved in a meaningful survey, it is desirable that the equipment attached to a receiver for producing a recording of the information required for an audience survey should preferably be inexpensive. Also, the cost of each installation should preferably be kept low. Other requirements preferred for the equipment is that it be dependable and its output be readily interpretable. Otherwise the equipment, while operative for the purpose intended, is economically not feasible.

Accordingly, an object of the present invention is to provide an audience rating system which enables an accurate and detailed survey of a large sample of a broadcast audience in a more economical manner than has been possible heretofore.

Another object is to provide an audience rating system which utilizes an improved relatively simple audience rating apparatus in conjunction with an existing receiver wherein the apparatus is connected to the receiver in a very simple manner.

Still another object is to provide an audience rating system of the type which utilizes a periodic collection of records made at a receiver which very simply enables a determination of the listening audience over the course of a broadcast, and which enables a large number of broadcasting stations to be monitored at many instants of time between collections of records.

These and other objects of the invention are realized in an audience rating system wherein at a transmitter, a coded signal is added to the audio portion of a television or radio program to be rated. The coded signal is added at the instant when a survey is made. An attachment for detecting and recording the coded signal is connected to the loudspeaker coil of the receiver of each family participating in the survey. If the receiver is on and is tuned to the particular program being rated, the attachment will detect the coded signal. The detected coded signal turns on the recorder of the system for a brief period of time, and the coded signal is then recorded on tape. A large number of television and radio stations may be surveyed at random intervals, however each station transmits a different coded signal. At the end of a month or other convenient period, the tapes are collected from the receiver of each participant in the survey. Each tape will normally have recorded thereon a large number of coded signals, each signal indicating that a particular program was listened to at a particular time.

The coded signals may be at a frequency, which is selected so that the coded signals are barely audible, and do not interfere with listening enjoyment of the program. By way of example, this frequency may be 12 kHz. The code signals are also at a low enough frequency to be readily processed through the audio circuits of almost all receivers. The recorder system attaches to the home receiver in a very simple manner by merely connecting wires to the loudspeaker leads of the receiver. The recorder system is activated only when at least a certain minimum amplitude of coded signal is received, which prevents recording when the sound is turned very low, indicating that, for example, a television commercial is not being listened to, even though the receiver is on.

In one embodiment of the invention, the coded signals are originated from a central office, which is connected by a telephone line to each participating television and radio station. The coded signals are of a nature such that they can be transmitted over a narrow bandwidth, and therefore can be sent over inexpensive telephone lines to the broadcasting stations.

Thus, the invention provides a rating system which permits surveys to be taken at precise times, such as when a particular commercial message is being broadcast, with inexpensive equipment, which is easily installed in each home participating in a survey.

The novel features that are considered characteristic of this invention are set forth with particularity in the appended claims. The invention itself both as to its organization and method of operation, as well as additional objects and advantages thereof, will best be understood from the following description when read in connection with the accompanying drawings, in which:

Figure 1:
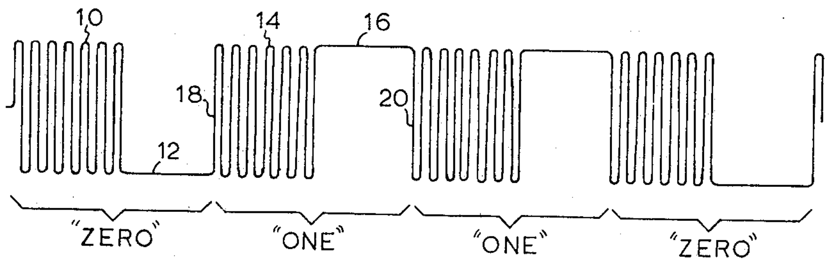
FIGURE 1 is a waveshape representation of a pulse code train used in this invention.

Before describing the apparatus comprising this invention an understanding of the signals to be used therein should be had. A code-carrying sub carrier signal, such as the 12 kHz. signal earlier referred to, which is to be added to the audio portion of a program to be rated, is preferably of a high enough frequency so that it cannot be readily heard by the human ear. However, it must be within the audio bandwidth transmitted by the station, which in the United States is presently limited by Federal Communications Commission regulations to 15.0 kHz. in the case of commercial television audio and F.M. radio broadcasts. A center frequency of 12 kHz. has been found adequate, inasmuch as it is about inaudible to the average person and is of low enough frequency to avoid interference from the 15.750 kHz. horizontal sweep circuits presently used in most television receivers. A 12 kHz. frequency is readily processed by the audio circuits of even poor receivers, at least up to the loudspeaker coil.

The 12 kHz. sub carrier signal is frequency modulated with a coded signal, which by way of example is determined to have a digit rate of 7.5 pulses per second. The code signals are in the form of binary digits, and are represented by the waveforms in FIGURE 1. The signals represented in FIGURE 1 comprise bursts of 151.4 Hz. nearly sine-wave signals interspaced with positive or negative pedestal voltages. A binary "zero" is defined by a tone burst 10, of 151.4 Hz. followed by a negative pedestal 12. A binary "one" is defined by a tone burst 14, of 151.4 Hz., followed by a positive pedestal, 16. Signals in this form are modulated on the 12 kHz. carrier for broadcast, are recovered by the apparatus at the receiver, and are recorded on tape by the tape recorder. Upon playback of the tape by the tape recorder at the survey company, the derivative of the recorded signals is obtained, which has the waveform shown in FIGURE 2.

Figure 4:
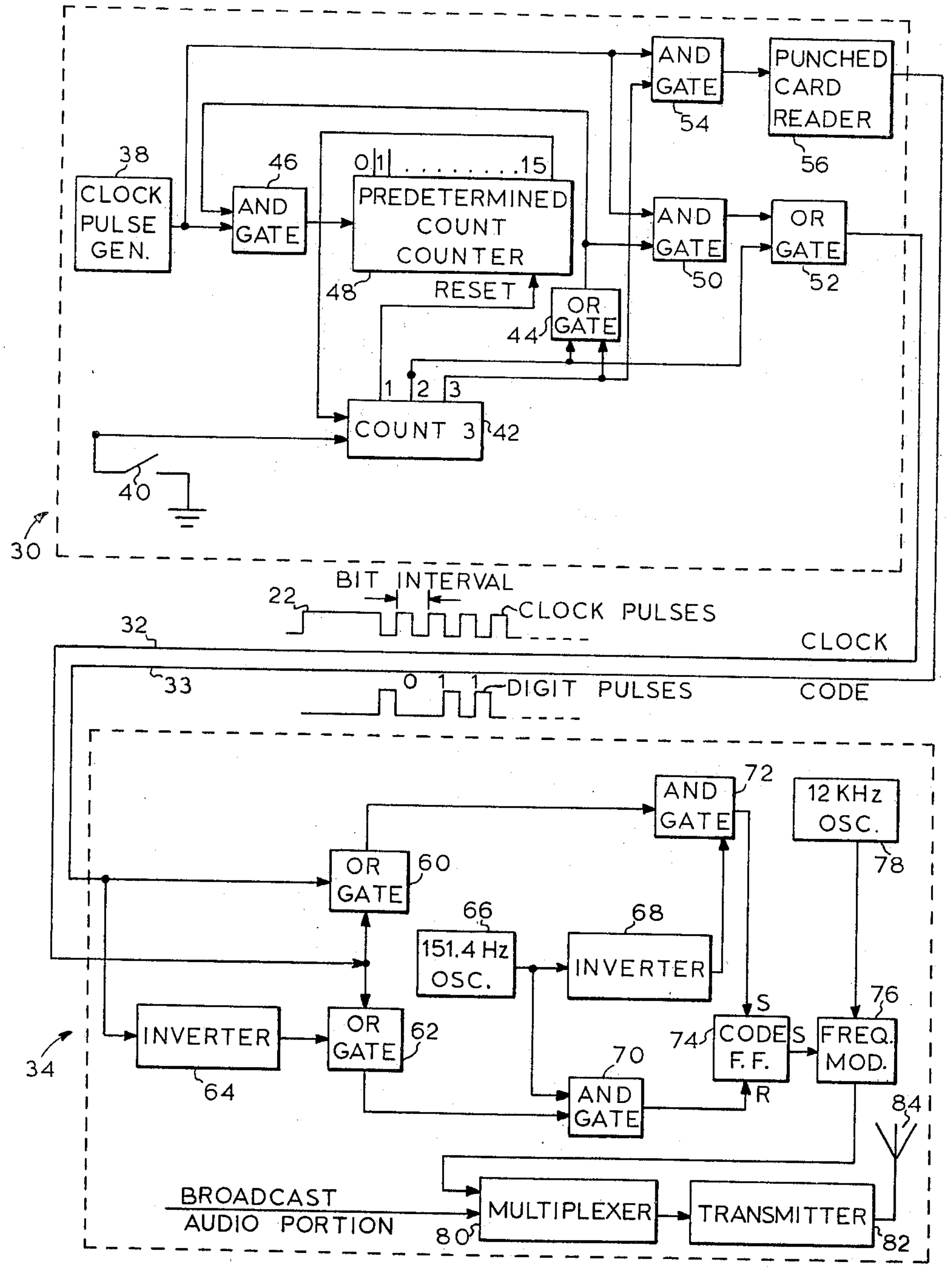
FIGURE 4 is a block schematic diagram of a control center and transmitter constructed in accordance with this invention.

Each tone burst interval, followed by a period of zero voltage in the derivative signals shown in FIGURE 4, signifies that a digit is present. A binary "zero" or "one" is indicated by the polarity of the transition at the end of a datum line, or period of zero voltage. A "zero" is represented by a positive going transition, as at 18, while a "one" is represented by a negative going transition, as at 20.

In order to start a tape recorder which is connected to a receiver, a starting signal must be delivered to the circuits which energize the tape recorder motor. The starting signal is preferably contained in the 12 kHz. coded signal to enable its passage through the same circuits as are used to detect the binary digits. The starting signal should be of a nature which enables the circuits detecting it to reject spurious information, such as may be contained in the audio, and thereby make the recorder immune to false triggering. This is accomplished by using a long burst, such as of one second duration, of a tone signal which is frequency modulated on the 12 kHz. signal. In the receiver the tone signal trips a resonant reed relay and starts the tape recorder. A continuous tone of 151.4 Hz. can be used as the starting signal, so that the same sine wave generator and other apparatuses used in connection with generating the binary digits can be used to generate this signal and also at the receiver to detect the starting signal.

A portion of the starting signal being transmitted is recorded on the tape after the tape recorder is turned on. This long 151.4 Hz. tone burst serves to indicate the start of a new message when the tape is played back in a tape playback machine.

Figure 2:
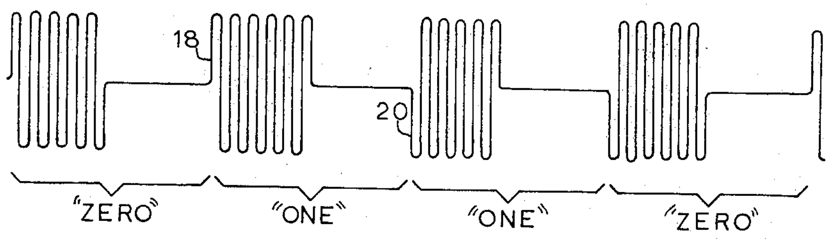
FIGURE 2 is a waveshape representation of a pulse code train used herein as it appears when recorded magnetically and then read.

The choice of the 151.4 Hz. frequency, which has been assumed as adequate, is actually based upon the use of a digit rate of 7.5 per second. Each such digit, as represented in FIGURE 1, is composed of a $\frac{1}{15}$ second period containing the tone signal. In order to reduce the chance of noise causing a digit to be incorrectly recorded, it is desirable to employ a large number of cycles of the tone signal during each such $\frac{1}{15}$ second period. The use of ten tone cycles during such a period is considered as adequate.

The period of time occupied by the long tone burst starting signal should be sufficient to operate a reed relay which starts the tape recorder, and to allow the tape recorder to record some of the starting signals for later recognition by a tape reader that a new rating is being read. A starting signal on the order of one second duration has been found adequate. Thus, the total transmitted message for each rating is of two seconds duration.

Figure 3:
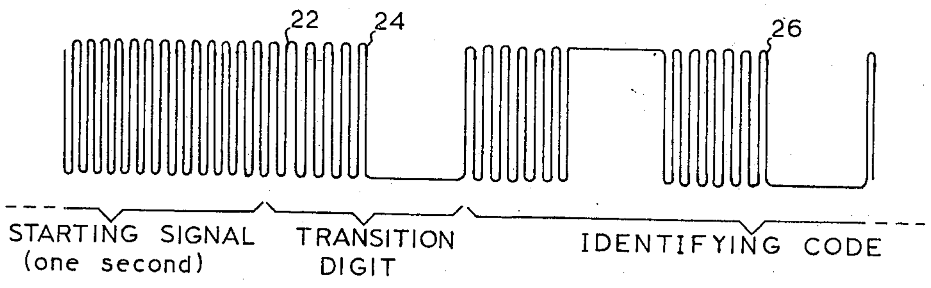
FIGURE 3 is a representation of a coded message showing the three sections of a complete message.

FIGURE 3 illustrates the waveform of a typical rating message, which is transmitted by modulation of a 12 kHz. carrier which, in turn, is multiplexed with a program audio. The leading portion 22 represents the starting signal of one second duration, which is merely a continuous tone of 151.4 Hz. The starting signal 22 is followed by a transition digit 24 which carries no information, but is a result of the need to transmit a binary "zero" digit from the control center to the transmitting station to indicate the transition from a starting signal to binary digits. The rest of the message 26 comprises a number of binary digit representations required for indicating the particular participating station and the time.

The waveform shown in FIGURE 3 may be generated at a central location and then sent to a requesting transmitting location over telephone lines for subsequent transmission. However, this requires the more expensive telephone lines because of the bandwidth requirements. Thus, as is described in connection with FIGURES 4 and 5, lower frequency signals are generated at a central location or control center, which can then be sent to a requesting transmitting location. These lower frequency signals, which carry all the information of the waveform shown in FIGURE 3, are then converted into such a waveform which is then suitable for transmitting.

Referring now to FIGURE 4, in accordance with this invention a control center 30 generates a train of control pulses whenever a survey or rating of a particular broadcast program is to be taken. The control pulses may be delivered either over telephone lines 33, or may be transmitted by air, in well known manner if so desired, to a radio or television broadcasting station 34. The pulses serve to control equipment at the station 34, where there is generated a high frequency sub-carrier signal such as at 12 kHz., which is frequency modulated with the program identifying code. F.M. modulated sub-carrier signal is added to or multiplexed with the audio portion of the broadcast, so that it is transmitted by the transmitter antenna 36 along with the sound portion of the broadcast.

The central control station 30 and transmitting station 34 shown in FIGURE 4 contain the circuits to enable the generation and transmittal of the signals described above, in connection with FIGURE 3. Only a simplified diagram is shown in the drawing, since the circuitry required is quite well known to those skilled in the transmitting and receiving art. The control station 30 includes a clock pulse generator 38 which generates clock pulses at a predetermined rate and delivers them to subsequent circuitry. A monetary switch, 40, is actuated when it is desired to make a rating. The switch may be operated from a remote location, by suitable relay circuitry, if desired. Closure of switch 40 enables a "count three" counter 42 to advance from its first to its second count. An OR gate 44 in response to the second count output of counter 42 enables an AND gate 46 to pass a clock pulse from the clock pulse generator 38 to a predetermined count counter 48. AND gate 46 is maintained able to pass clock pulses to advance the count of the counter 46 for as long as the "count three" counter remains in its second and third count states. The "count three" counter is advanced to its next state in response to the last count output of counter 48.

An AND gate 50 is enabled by the output of OR gate 44 to pass clock pulses to an OR gate 52 and therethrough to a telephone line 32. OR gate 52 also has applied to its input the "count two" count of counter 42. Therefore, the output of the OR gate 52 during the interval that counter 42 is in its "count two" state will be a long pulse (22A) having a length determined by the duration of the "count two" output of counter 42.

When the counter 48 reaches its last count state, the "count three" counter 42 is driven to its third count state. Thus, counter 48 has determined the length of the starting pulse. Since the third count output counter 42 is also applied to OR gate 44, AND gate 46 and AND gate 50 are still maintained enabled. An AND gate 54 is also enabled by the third count state of the counter 42. AND gate 46 enables the counter 48 to recycle and advance again in response to clock pulses, while AND gate 54 can apply clock pulses to a punched card reader 56 to clock its reading operation. The punched card reader produces a pulse to represent a "one" and no pulse to represent a "zero.'" As may be seen on the drawing, a "bit" interval is the interval occurring from the start of one clock pulse to the start of the succeeding clock pulse. A "one" or digit pulse will always occur in the interval between clock pulses. No pulse in this interval signifies a zero. The digit pulses are transmitted or sent by a line 33 to the transmitting station, and the accompanying clock pulses by the line 32. It will be noted that this time OR gate 52 only sends clock pulses on the clock pulse line 32. As shown on the drawing, clock pulses alternate with "one" digit pulses.

The card reader 54 is actuated in response to the clock pulses to read a card containing the identifying code punched therein for a particular rating. The card contains a code pattern of holes which are sensed to produce a serial code pattern of the type described.

When the counter 48 reaches the last count for the second time, it returns the "count three" counter 42 back to its first count state, whereupon AND gates 44, 46 and 54 are disabled. The "count three" counter returning to its first count state resets counter 48. The control center is then made ready for a new operation. Thus, in summary, when the starting switch is closed, the telephone line 32 delivers a starting signal having one second duration followed by a number of equally spaced clock pulses. Line 33 delivers a train of code signals denoting digits, a "one" being denoted by a pulse and a "zero" being denoted by no pulse. The first digit of the train of code signals is always a "zero" and serves as a transition digit which indicates the transition from the starting signal to the code.

At the transmitter, the clock pulse carrying line 32 is applied to two OR gates respectively 60, 62, and the code pulse carrying line 33 is applied to an inverter 64, the output of which is applied to the OR gate 62. The code signal carrying line 32 is also applied as a second input to OR gate 60. A 151.4 Hz. oscillator 66 applies its output to an inverter 68 and also to an AND gate 70 to which the output of the OR gate 62 is also applied as an enabling input. OR gate 60 can enable an AND gate 72, the second input to which is the output of the inverter 68. A flip-flop 74 is driven to its reset state in the presence of an output from an AND gate 70 and to its set state in the presence of an output from an AND gate 72.

In the presence of a pulse on the clock pulse line 32, AND gate 70 is enabled and can pass an oscillation from the oscillator 66 to drive the code flip-flop to its reset state. In the intervals when the oscillator output makes a zero crossing, inverter 68 produces an output whereby the AND gate 72, in the presence of the clock pulse can set the code flip-flop. Thus, in the presence of a pulse on the clock pulse line, code flip-flop 74 is driven between its reset and set state at twice the output frequency of the oscillator 66, and therefore the set output from the flip-flop has a frequency of 151.4 Hz. Therefore, in the presence of the first 15 clock pulses when the transmission is initiated, there will be produced at the output of the flip-flop 74 a pulse train having the frequency of 151.4 Hz.

In the presence of a one representative code pulse, which happens in the interval following a clock pulse, the AND gate 72 is enabled whereby the code flip-flop 74 is set. The code flip-flop cannot be reset during the interval of the code pulse alone since no enabling input is applied to the AND gate 70, the inverter 64 being turned off at this time. If no "one" representative pulse occurs after a clock pulse then the code flip-flop is reset by reason of AND gate 70 being enabled by the inverter 64 output via OR gate 62, whereby code flip-flop 74 is reset by the output of the oscillator 66. It remains reset until the next clock pulse arrives.

From the foregoing, it should be clear how the code flip-flop in response to a clock and the binary "1" representative signal produces an output comprising a first interval, which is for the duration of the clock pulse a sequence of 151.4 Hz. pulses, followed by a signal having a high DC level, caused by the set output of the code flip-ffop in response to the digit pulse. In response to a clock and the "0" representative code signal, the output of the code flip-flop comprises a series of 151.4 Hz. pulses caused by the clock pulse followed by a zero level DC signal, since code flip-flop 70 is placed in its reset state in the absence of either a clock or digit pulse.

The output of the code flip-flop is applied to a frequency modulator 76 which frequency modulates the code signal train on the output of 12 kHz. oscillator, 78. The output of the frequency modulator is multiplexed by a multiplexer 80 together with the audio portion of the broadcast. The output of the multiplexer 80 is then connected to the transmitter 82, which modulates it on a carrier wave and thereafter applies it to an antenna 84 for radiation to the local receivers.

Figure 5:
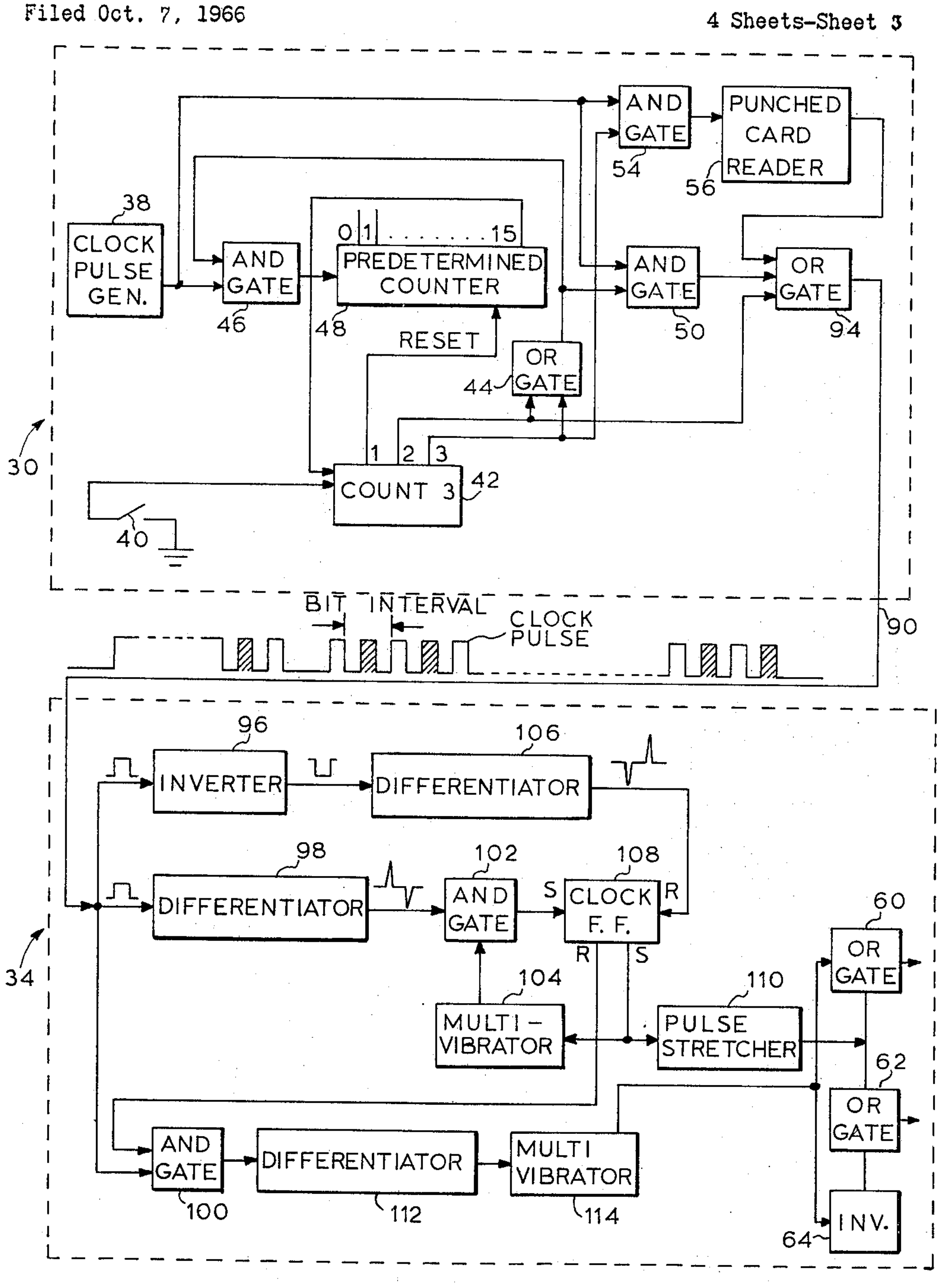
FIGURE 5 is a block schematic diagram of another arrangement for a control center and transmitter.

Since, according to FIGURE 4, clock pulses accompany the code pulse train sent from the control station center, one can obviate the necessity of using two lines or modulating two signals on a carrier if air transmission is to be used, if it is made feasible to separate clock pulses from code pulses should the two pulse trains be combined. They can easily be separated by making the clock and one digit pulses narrow enough so that they do not overlap before combining the clock and code pulse trains. A system for doing this is shown in FIGURE 5. The structure of the control station 30 is again shown with modifications required for sending out the signals on a single line 90. Similarly functioning structures will bear the same reference numerals as in FIGURE 4.

The sole changes required in the control station of FIGURE 5 are that an OR gate 94 be provided in place of OR gate 52 which receives the output of punched card reader 56 as well as clock pulses from AND gate 50 and thus interleaves these and sends them out as a single wavetrain on the line 90. The total output of OR gate 94 is accordingly a long single pulse followed by a train of 15 bit intervals. There is a clock pulse in each interval and a code pulse in intervals denoting a "one" as shown in the drawing.

At the transmitter 34, in front of the OR gates 60 and 62 and the inverter 64 is the equipment required for separating the clock pulses from the code pulses. The incoming pulses are applied to an inverter 96, a differentiator circuit 98 and an AND gate 100. The differentiator output consisting of pulses of different polarity occurring at the leading and trailing edge of each input pulse, is applied to an AND gate 102 which can only respond to the leading edge pulses, and then only when no inhibit input is received from a multivibrator 104. The output of AND gate 102 drives a clock flip-flop 108 to its set state. The inverter 96 inverts the polarity of the pulses and applies them to a differentiator 106. The output of the differentiator 106 is the reverse of the output of differentiator 98. It is applied to a clock flip-flop 108 so that the flip-flop is driven to its reset state in response to the trailing edge of each pulse input to the inverter 96.

Accordingly, clock flip-flop 108 produces a set output during each clock pulse interval, which occurs during the first pulse of the digit interval, and produces a reset output during the second half of the digit intervals. The multivibrator 104 inhibits AND gate 102 and thus keeps flip-flop 108 in its reset state during the second half of each code digit interval regardless of whether or not a pulse occurs during that interval.

The output of flip-flop 108 is applied to a pulse stretcher circuit 110 whose output consists of clock pulses applied to OR gates 60 and 62. The AND gate 100 is enabled by the reset output of flip-flop 108 whereby, since this output is only available during the second half of a code digit interval, AND gate 100 provides an output only in the presence of a "one" digit. The AND gate output drives a differentiator 112 which in turn drives a multivibrator 114 with the leading pulse edges. Multivibrator 114 provides an output pulse which is suitably shaped and has the proper width. This pulse then drives OR gate 60 and inverter 64. The operation of the apparatus that follows the OR gates 60 and 62 is as has been previously described. The pulse stretcher 110 and the multivibrator 114 operate to widen the clock and "one" digit pulses so that they can operate the following circuitry properly, in the manner described in connection with FIGURE 4.

Figure 6:
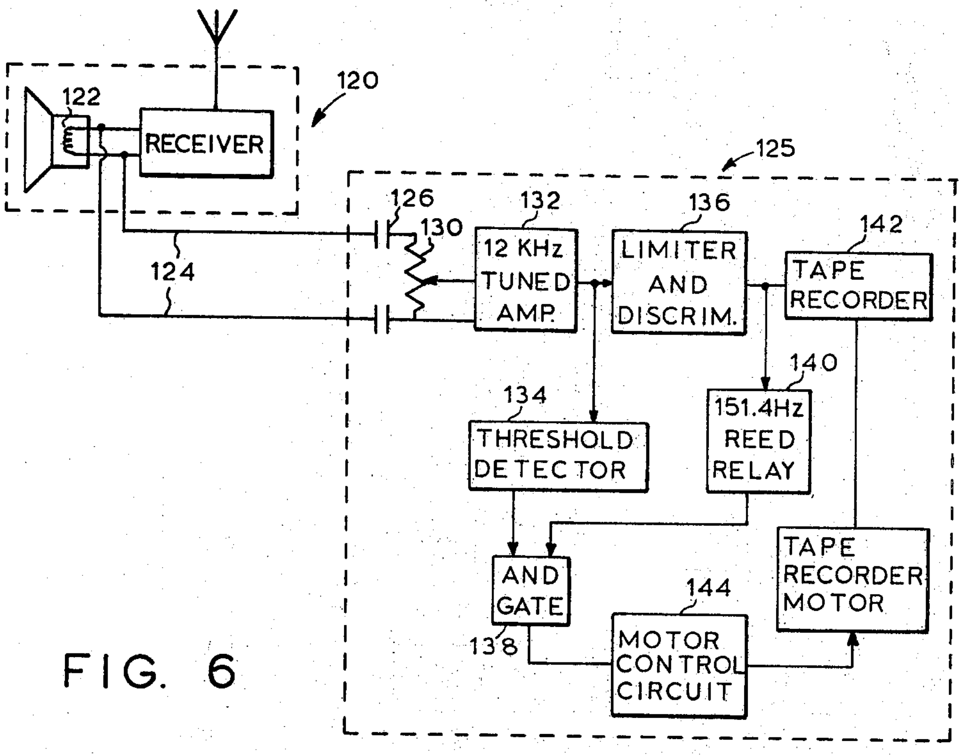
FIGURE 6 is a block schematic diagram of a receiver and recorder system constructed in accordance with this invention.

FIGURE 6 is a block schematic diagram of a receiver including apparatus for utilizing the code signal which accompanies the standard broadcast. The signals are received by the reecivER 120 which represents a typical home radio or television set. The audio portion of the broadcast (including the modulated 12 kHz. signal) is detected, amplified and delivered to the loudspeaker coil 122 of the receiver, in the usual manner. In accordance with this invention a pair of wires 124 are connected between the loudspeaker coil 122 and the tape recorder apparatus 125 through a pair of isolation capacitors 126, 128. Tape recorder apparatus 125 includes an input potentiometer 130 which is preset so that the output signal level will not be recorded if the receiver audio is tuned very low, as is sometimes done during commercial messages.

The output of the potentiometer is applied to a 12 kHz. tuned amplifier 132 which serves to filter out all portions of the audio except the modulated 12 kHz. signal. The tuned amplifier output is applied to a threshold detector 134 and also to limiter and discriminator circuit 136. When the signal input to the threshold detector 134 exceeds the threshold level, an output is applied to an AND gate 138. The second input to the AND gate, to enable it to produce an output, comprises the output of a 151.4 Hz. resonant reed relay 140. It will be recalled that this resonant reed relay responds to the presence of the one second long signal which precedes the coded signal in a transmission. The output of limiter and discriminator 136 is connected to the reed relay 140 and also to the tape recorder 142. Thus, the reed relay will be energized in the presence of the starting signal whereby AND gate 138 can provide an output to the motor control circuit 144. The motor control circuit can then turn on the tape recorder motor 146 whereby the tape recorder 142 can make a recording of the output signal from the limiter and discriminator 136.

Once the motor control circuit 144 is energized, it stays energized for a sufficiently long interval to record the transmitted code sequence. A suitable latching circuit (not shown) can keep the motor control circuit energized after the reed relay is no longer operated, at the termination of the starting signal. At the end of the message the tape recorder is de-energized, and the apparatus is now ready for the next transmission.

Figure 7:
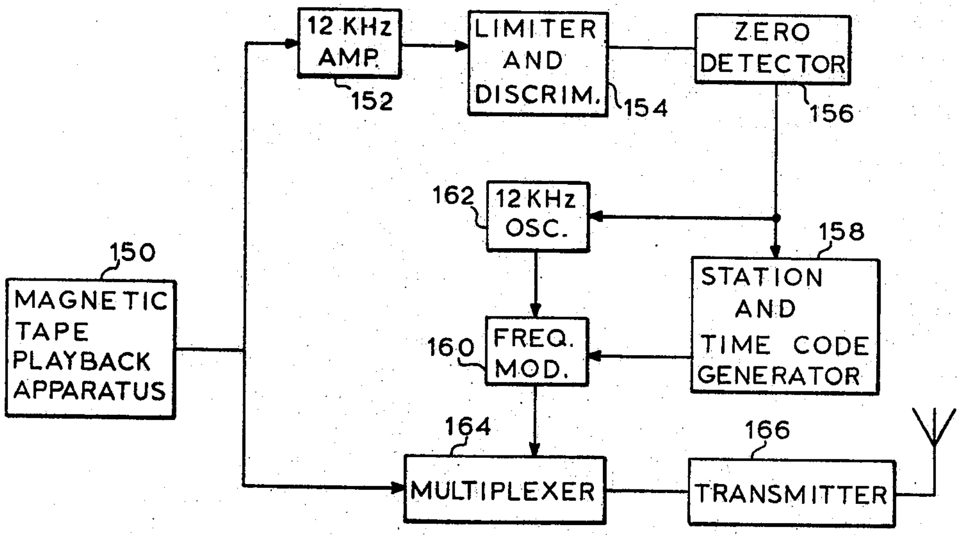
FIGURE 7 is a block schematic diagram of another embodiment of the invention at the transmitter.

In another embodiment of the invention, illustrated in FIGURE 7, no central control station is connected to the participating broadcasting stations, yet all broadcasting stations use a single version of each commercial message or program to be rated. In this embodiment, the commercial message or program contains a coded message to identify that commercial, and it also contains a gap. The local broadcasting station generates a station-and-time identifying code during the time of the gap. Thus, the total coded message detected and recorded at each receiver participating in the survey contains information identifying the commercal message or program, the local broadcasting station, and the time at which the rating was taken.

With reference now to FIGURE 7, the commercial message to be rated is prerecorded on tape and is played back on a tape playback machine 150 at the broadcasting station. The output of the tape machine 150 is delivered to a 12 kHz. amplifier 152 whose output is passed through a limiter and discriminator 154. The commercial message contains a 12 kHz. signal, frequency modulated by 151.4 Hz. coded signals and these signals are obtained as the output of discriminator 154. However, the coded signal this time contains a one-second duration 151.4 Hz. sine wave starting signal, followed by a transition signal, which consists of a $\frac{1}{15}$ second tone followed by a $\frac{1}{15}$ second negative pedestal. This is the same as the first two portions of the signal represented in FIGURE 3. However, in the present situation, after the transition signal, the pedestal is allowed to decay to zero and the commercial message recording does not produce any further coded signals for a period of time such as one second, after which time it produces a series of digits which identify that particular commercial message.

During the hiatus, a local code may be generated to identify the local broadcasting station and time, in the manner to be described.

The output of the discriminator 154 is delivered to a "zero" detector 156 which detects the occurrence of the transition digit. When a transition digit is detected, a starting signal is delivered to a station and time code generator 158. The generator 158 generates a series of digits which identify the station, followed by a series of digits which indicate the time of day (as determined by a clock device within the generator). These signals are delivered to a frequency modulator 160 for frequency modulating a 12 kHz. signal from a 12 kHz. oscillator 162, and the 12 kHz. modulated signal is added to the program audio from the tape playback machine 150 in a multiplexer 164. The multiplexed signal is then transmitted, by transmitter 166. The several digits identifying the station and time of day just fill the gap between the transition signal and the series digits which identify the particular commercial message. The construction and operation of the recording apparatus at each receiver is the same as that shown in FIGURE 6.

There has accordingly been described and shown a novel and useful rating system of a type wherein a tape recorder is actuated to make an encoded recording at a receiver only over the interval of the actual recording. The recording may be read and tallied by suitable automatic reading apparatus. The system substantially minimizes the possible effects of noise on the signals being recorded. The system is relatively inexpensive and extremely simple to install.

What is claimed is:

1. In a system for broadcasting program material including audio program signals from a transmitter to a receiver having an audio program signal reproducing system, an audience rating system comprising at said transmitter code generating means for generating program identifying code signals at an audio frequency, modulator means connected to said code generating means and means for generating an audio frequency carrier for modulating said code signals onto said audio frequency carrier, transmitter means connected to said modulator means for separably adding said audio carrier modulated by said code signals to the audio program signals being broadcast from said transmitter, means connected to said means for transmitting said added signals to said receiver, said receiver having detecting means to which said received added signals are applied,
means coupling said detecting means to the receiver audio program signal reproducing system, said detecting means including;
means for filtering the modulated audio frequency carrier signal from said audio program signals,
means connected to said means for filtering for demodulating said program identifying code signals from said audio frequency carrier signal,
threshold detector means coupled to said means for demodulating output for producing a first recorder enabling output signal responsive to said means for demodulating output exceeding a predetermined threshold level, and
reed relay means responsive to said means for demodulating output including a predetermined code signal for producing a second recorder enabling output signal, and
recorder means at said receiver coupled to said threshold detector means and to said reed relay means for being energized responsive to said first and second recorder enabling output signals.

2. A rating system as defined in claim 1 wherein:
said program identifying code signal includes a high audio frequency tone modulated by a signal having portions of an audio frequency much lower than said high audio frequency; and
said means for separably adding said code signal to the audio program signals of a broadcast includes recording apparatus for recording the audio program intended to be heard by the audience, and for recording on the same record, said code signal, whereby the generation of the code signal at the broadcasting station is acomplished with a minimum of equipment and effort.

3. A rating system as defined in claim 1 wherein:
said code generating means includes a first code apparatus for generating a first portion of said code signals which identifies a particular program, and a second code apparatus for generating a second portion of said code signals which identifies at least a particular broadcasting station;
said means for separably adding said code signals to the program signals being broadcast from said transmitter includes a recording apparatus for recording the audio program intended to be heard by the audience and for recording on the same record, said first portion of said code signals;
a playback apparatus for playing said record containing said audio program intended to be heard by the audience and said first portion of said code signals; and
multiplex means connected to said playback apparatus and to said second code apparatus for multiplexing their outputs.'

4. A rating system comprising:
a control station for generating pulses, at least one period of pulse generation including pulses spaced according to a prearranged code which identifies a particular rating survey;
transmission line means connected to said control station for carrying said pulses;
a broadcasting station for broadcasting an audio program, said station including a code synthesizer means connected to said transmission line and responsive to said pulses space according to a prearranged code for generating a signal including a starting portion comprising a tone of predetermined frequency and a rating identifying portion comprising tone bursts of said predetermined frequency spaced apart by periods of saturated signal, each of said periods of saturated signal having a duration of at least several cycles of said tone bursts;
oscillator means for generating a high audio frequency signal of a frequency at least several times the frequency of said tone;
frequency modulator means connected to said code synthesizer means and said oscillator means for generating a signal comprising said high audio frequency signal frequency modulated by the output of said code synthesizer means;
multiplexer means connected to said modulator means for adding the output thereof the audio portion of the program to be broadcast and intended to be heard by the broadcast audience;
recorder apparatus adapted for connection to an audio output of a receiver, said recorder apparatus including
filter means for passing the portion of the audio portion of a broadcast containing said frequency modulated high audio frequency signal;
discriminator means connected to said filter means output for producing therefrom said starting portion and said rating identification signals;
a recorder connected to said discriminator means for recording at least a portion of the output thereof; and
recorder drive means connected to said discriminator and to said recorder for operating said recorder upon the detection of said starting portion signal.

References Cited

UNITED STATES PATENTS

| | | | |
|---|---|---|---|
| 2,740,106 | 3/1956 | Phelps | 325—55 |
| 3,310,741 | 3/1967 | Uitermark | 325—55 |
| 3,336,444 | 8/1967 | Piechocki | 325—55 |
| 3,397,402 | 8/1968 | Schneider | 325—31 |

RICHARD MURRAY, Primary Examiner
ALBERT J. MAYER, Assistant Examiner

U.S. Cl. X.R.

325—52, 53, 55, 62, 66